United States Patent [19]

Aggen

[11] 4,011,120
[45] Mar. 8, 1977

[54] METHOD FOR FASTENING CERAMIC MAGNETS TO A FLYWHEEL USING CENTRIFUGAL FORCE

[75] Inventor: Glenroy Newcomb Aggen, New Holstein, Wis.

[73] Assignee: Tecumseh Products Company, Tecumseh, Mich.

[22] Filed: May 2, 1975

[21] Appl. No.: 573,929

[52] U.S. Cl. .................................. 156/74; 29/598; 228/212

[51] Int. Cl.² .................. B32B 31/16; H02K 15/02

[58] Field of Search .......... 156/74; 29/DIG. 6, 598; 228/212; 310/153, 156

[56] References Cited

UNITED STATES PATENTS

| | | | |
|---|---|---|---|
| 2,961,716 | 11/1960 | Luenberger | 156/74 |
| 3,265,913 | 8/1966 | Irwin | 310/153 |
| 3,427,486 | 2/1969 | Whitney | 310/156 |
| 3,797,106 | 3/1974 | Costello | 29/598 |
| 3,828,212 | 8/1974 | Harkness et al. | 310/153 |

Primary Examiner—Douglas J. Drummond
Attorney, Agent, or Firm—Barnes, Kisselle, Raisch & Choate

[57] ABSTRACT

A plurality of ceramic magnets are bonded on the inside of a flywheel by applying an adhesive to outside surfaces of the magnets, locating the magnets in a rotatable fixture, placing the flywheel over the magnets with a slight radial clearance between the magnets and the flywheel and then spinning the fixture with the flywheel mounted thereon so that centrifugal force urges the magnets radially outwardly against the flywheel and holds the magnets in place while the adhesive sets. The fixture includes positioning pins that roughly locate the magnets when they are placed on the fixture and then accurately guide the magnets to precise locations on the flywheel as the magnets move radially outwardly due to centrifugal force.

24 Claims, 13 Drawing Figures

METHOD FOR FASTENING CERAMIC MAGNETS TO A FLYWHEEL USING CENTRIFUGAL FORCE

This invention relates to a manufacturing method and apparatus for use in assembling discrete parts on the inside of another part and, more particularly, to the method and apparatus that uses centrifugal force in fastening ceramic magnets to the inside surface of a flywheel of an internal combustion engine or the like.

Flywheels for small internal combustion engines are manufactured by high volume production techniques. In the small engine field, cost is an extremely important factor and every effort is directed toward reducing the cost per unit so as to reduce the total cost of the engine. The flywheel, particularly when it carries a plurality of magnets for use in an alternator, is a relatively expensive component. For example, when alnico magnets have been used in the past, the magnets were embedded directly in an aluminum casting and the inside surface of the flywheel was machined. In recent years, ceramic magnets have been suggested for magneto-alternators. Various relatively expensive techniques have been suggested to secure the magnets to the flywheel, for example, as shown in U.S. Pat. Nos. 3,390,291 (Eberline et al) granted June 25, 1968, 3,265,913 (Irwin) granted Aug. 9, 1966, and 3,818,586 (Harkness et al) granted June 25, 1974. The Harkness et al patent recites several important disadvantages in the Eberline et al and Irwin arrangements. Harkness et al discloses a rather elaborate cage that defines radially inwardly opening pockets into which respective magnets are inserted and then a special tool is used to mechanically force all of the blocks radially outwardly against the flywheel while an epoxy adhesive cures. This technique also has several disadvantges. The fixture is reasonably complex and must be modified substantially for use with flywheels of different sizes or construction and further modified for different magnet configurations. Hence this technique is expensive with respect to both tooling and labor costs. The annular cage to position the magnets adds to the expense, not only for a specific flywheel but also because different cages must be used for flywheels having different dimensions or different magnet configurations. There are further disadvantages because the annular cage becomes part of the finished flywheel.

The Harkness et al technique has yet a further disadvantage that might not be readily apparent. Commercially available low-cost ceramic magnets are not ground within certain tolerances such that a good fit is always obtained with the inner periphery of the flywheel using the Harkness tool. Low-cost ceramic magnets may be slightly skewed due to the grinding process used so that the top, bottom and end faces are not in true radial planes relative to the inner and outer curved surfaces. With the Harkness tool, the force is applied directly to the magnet segment by means of a radially moving plunger which generally applies a uniform force against the inside surface of the magnet. This arrangement, together with the cage, causes the magnet to be forced against the inside of the flywheel in a fixed orientation that may not necessarily achieve the best fit against the flywheel with a skewed magnet. On the other hand, the fit between the flywheel and the magnet is important to obtain a good bond, particularly with certain adhesives such as anaerobic adhesives. For the anaerobic adhesive to cure effectively over a major portion of the interface between the magnet and the flywheel, it is necessary to have a close fit.

Among the objects of the present invention are to provide a method and apparatus for fastening magnets to a rotor of a dynamoelectric system that overcome the disadvantages in prior art techniques; that are extremely simple yet effective; that accurately locate the magnets on the rotor; that reduces the cost of the finished rotor; that can be modified simply and economically for rotors of different sizes and shapes; that can be modified simply and economically for different magnet configurations; and that allow the magnet to seat on the rotor with a uniform clost fit over a major portion of the interface between the magnet and the rotor and thus obtain an effective bond.

Other objects of the present invention include providing a simple, effective and low-cost method and apparatus for clamping individual parts on an inside surface of another part at precise, accurate locations while the individual parts are fastened to the other part.

Other objects, features and advantages of the present invention will become apparent in connection with the following description, the appended claims and the accompanying drawings in which:

Figures 1, 1A:
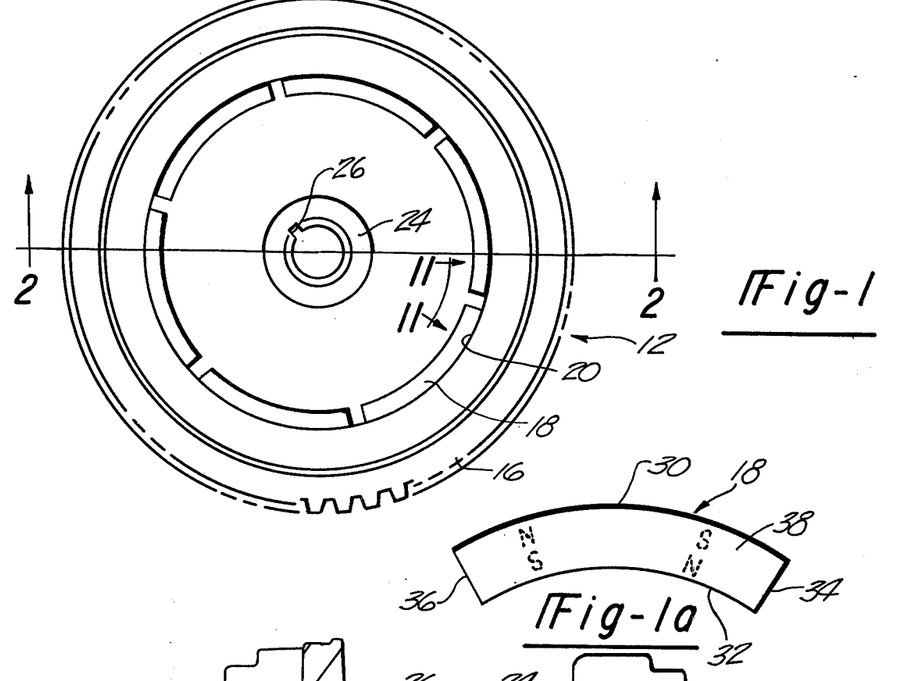
FIG. 1 is a plan view of a flywheel made according to the present invention.
FIG. 1a is an enlarged plan view of a radially polarized ceramic magnet in the flywheel of FIG. 1.
Figure 2:
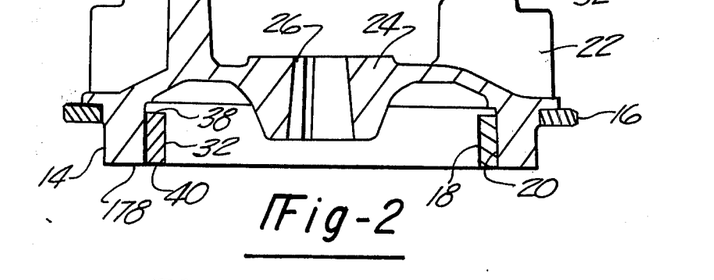
FIG. 2 is a section taken on line 2—2 of FIG. 1.

Referring to FIGS. 1 and 2, the method and apparatus of the present invention are useful in making a flywheel 12 that generally comprises a bell-shaped housing 14 having a starter gear 16 mounted on the outside of the flywheel and six ceramic block-like magnets 18 permanently bonded on the inside periphery 20 of the flywheel according to the present invention. The housing 14 is generally conventional in configuration and may be of cast iron or the like with the inner peripheral surface 20 being closely machined prior to fastening the magnets 18 in place. Flywheel 12 has the usual cooling fins 22 and hub 24 that is formed with a keyway 26 so that the flywheel can be keyed on the crankshaft of an engine at a precise angular position in a generally conventional manner.

As shown in FIG. 1a, each of the magnets 18 comprises a segment of magnetic material having an outer peripheral surface 30, an inner surface 32, end surfaces 34, 36, and top and bottom faces 38, 40. Magnet 18 is a commercial ceramic magnet that is ground within production tolerances so that the outer and inner faces 30, 32 are generally concentric, with the curvature of outer face 30 conforming closely to the machined inner periphery 20 of the housing 14. Magnet 18 can be magnetized in any suitable or desired fashion.

In the illustrated embodiment of the present invention, the magnet 18 was magnetized by zone charging in a radially polarized direction adjacent one end 34. An effective south pole is located at the inner periphery 32 (with a corresponding north pole at the outer periphery 30). At the other end, an effective north pole is at the inner periphery 32 (and a corresponding south pole at the outer periphery 30). Magnets 18 are fastened on the flywheel prior to magnetization. Although the magnet 18 may be referred to as a magnet, it will be apparent that this includes a segment magnetized in the desired way to provide the desired poles at the inner face 32. Hence the six-magnet arrangement shown in FIG. 1 might more accurately be described as a twelve-pole arrangement. This general type of rotor is particularly suited for a multiple-pole alternator used with a single-cylinder engine.

Referring to the apparatus shown in FIGS. 3–10, the spinning fixture 41 generally comprises a rotatable arbor assembly 42 having a main tapered pin 50 keyed on and rotatable with an upper sleeve 52 that also carries a main disc or plate 54 at its upper end. Sleeve 52 is fastened at its lower end by four screws 55 to a lower sleeve 56 that is journalled in a fixed machine bed 58 by bearings 60. The arbor assembly 42 is rotated by a motor indicated generally at 62 that drives a shaft 64 keyed at 66 in the lower sleeve 56. In general, adhesive is applied to magnets 18; the magnets 18 are assembled on the plate 54; the flywheel housing 14 is placed on pin 50; and the pin 50 is depressed to the position illustrated in FIG. 3 by means of a hold-down device 70 on a cup-shaped cover 72 fastened on bed 58. When the arbor assembly 42 is rotated by motor 62, magnets 18 are pressed against the inner periphery of flywheel 12 by centrifugal force and maintained at an accurate angular position on the flywheel while the adhesive sets up.

Figure 3:
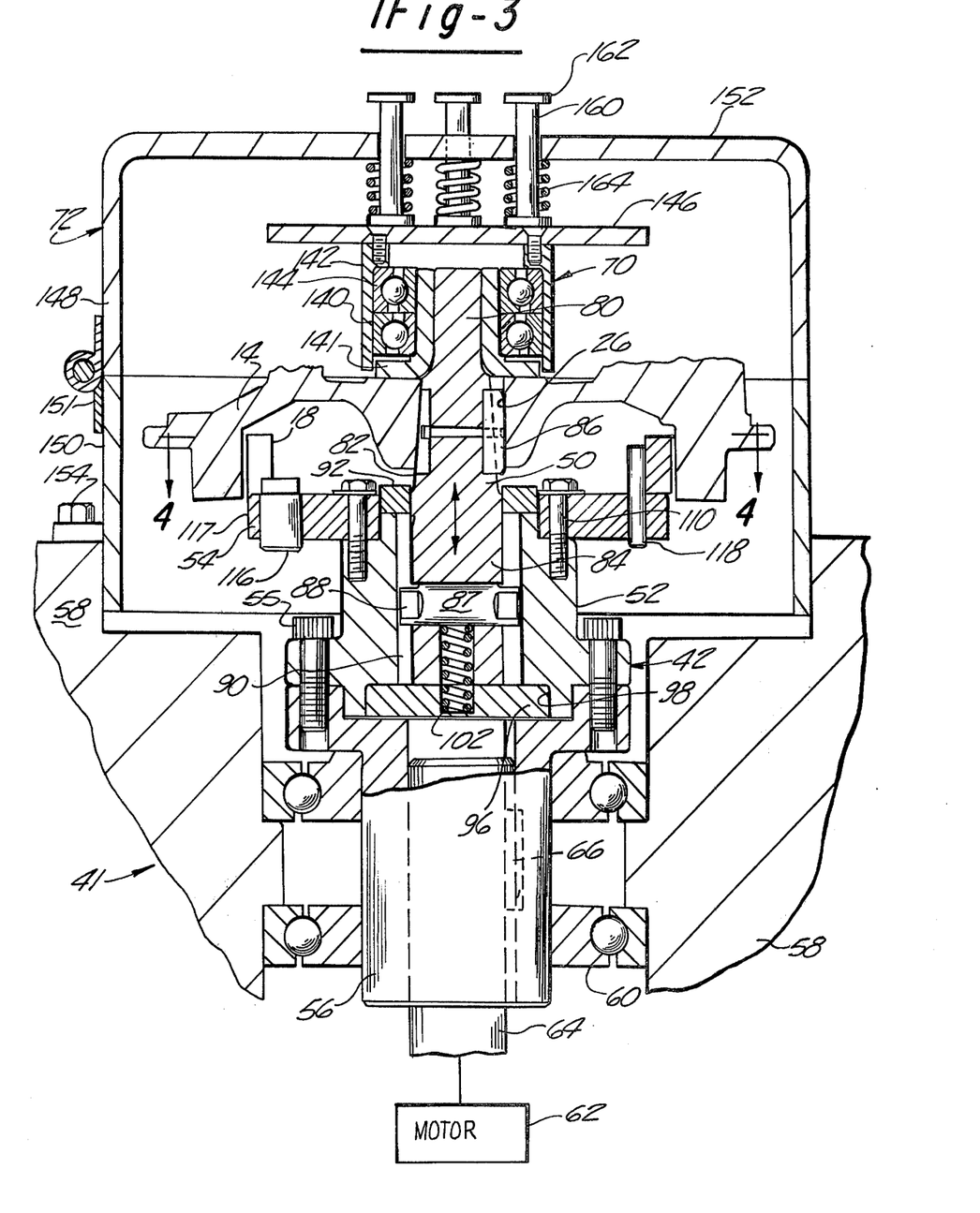
FIG. 3 is a vertical section taken on the offset section lines 3—3 of FIG. 4 through a spinning fixture used to clamp the magnets against the inside of the flywheel by centrifugal force according to the present invention.

Referring to the construction of arbor assembly 42 in greater detail, the tapered pin 50 includes an upper pilot portion 80, a tapered intermediate portion 82 and a lower cyindrical portion 84. A key 86 is fastened on the tapered portion 82 to engage in keyway 26 of the flywheel to accurately position the flywheel angularly of the arbor assembly. A cross pin 87 is mounted transversely in the lower pin portion 84 with ends 88 of the pin projecting radially outwardly and keying in opposed vertically extending keyway 90 in sleeve 52 so that pin 50 can move vertically in sleeve 52. An annular collar 92 fastened on the upper end of sleeve 52 by six screws 94 prevents pin 50 from moving out of the sleeve. The lower travel limit of pin 50 is set by a bottom plate 96 fastened in a recess 98 on the bottom of sleeve 52 by six screws 100. Pin 50 is urged to a raised position (FIG. 9) by a spring 102 compressed between pin 87 and plate 96. Plate 54 is of annular disc shape and is adjustably fastened on sleeve 52 by means of four screws 110 and four slots 112 so that the annular position of plate 54 can be set precisely relative to key 86. Six locater pin assemblies 114 are mounted on plate 54 radially outwardly of screws 110 and equally spaced circumferentially adjacent the outer peripheral edge of plate 54 to roughly position magnets 18 during setup and to guide and accurately position the magnets when they are forced outwardly against flywheel housing 14. Each pin assembly comprises a main locator pin 116 flanked by two vertical round pins 118, 119. Pins 118, 119 are radially inwardly of the outer edge 117 of plate 54 to roughly locate the radial position of the magnets 18 prior to spinning of the arbor assembly 42 so that the housing 14 fits over the magnets as shown in FIG. 3. The circumferential spacing between pin 119 on one pin assembly 114 and pin 118 on the adjacent pin assembly is less than that circumferential dimension of the magnets 18. Each pin 116 has a lower portion 124 pressed in plate 54 with the upper end of the pins having a horizontal shoulder 126 flush with the top face 120 of plate 54 and a locating portion 128 projecting above plate 54 and having opposed leading and trailing radial faces 130, 132, relatively, for a clockwise rotational direction illustrated by the arrows in FIGS. 4 and 5. Faces 130, 132 serve to roughly position the magnets 18 circumferentially of plate 54 during setup; and, as will layer be more apparent, the leading radial face 130 engages the trailing end face 34 on the magnet to accurately locate the angular position of the magnet when the arbor assembly is spun. Adjustment of plate 54 by means of screws 110 allows an accurate location of the leading face 130 on all of the pins 116 relative to the key 86.

The hold-down assembly 70 comprises an inner sleeve 140 journalled in an outer sleeve 142 by bearings 144 and dimensioned to moveably pilot on portion 80 of pin 50. The lower end 141 of sleeve 140 has a radial flange that engages housing 14 to seat the housing on the tapered pin section 82. Hold-down assembly 70 also includes an integral flat top plate 146. Cover 72 has upper and lower half sections 148, 150 hinged together at 151 and mounted on bed 58 by screws 154. Four pressure pins 160 (only three of which are shown in FIG. 3) are mounted on the top 152 to engage hold-down assembly 70 when the cover is closed. Pins 160 are retained on top 152 by headed ends 162 and are urged to a lower travel limit by compression springs 164. As the operator closes cover 72, pins 160 first engage plate 146; and as the cover is fully closed, springs 164 are compressed further as housing 14 seats and the pin bottoms on plate 96, as shown in FIG. 3. This bottoming out aligns the housing axially with the magnets 18.

Figure 9:
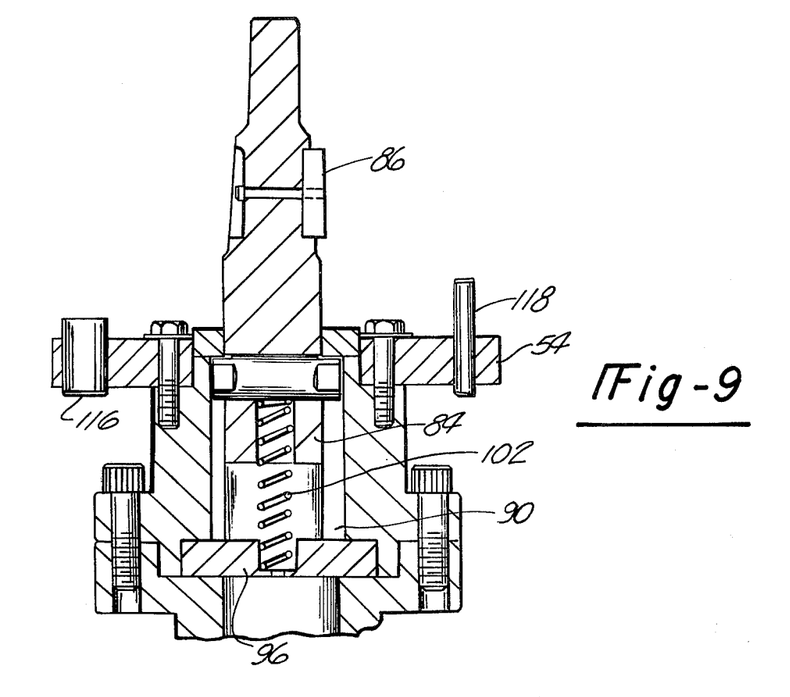
FIG. 9 is a vertical section of the fixture with an arbor of the fixture in a raised position prior to the beginning of an assembly operation.

Before setup of the fixture described hereinabove, with the cover 72 open and the flywheel housing removed, the pin 50 will be raised by spring 102 to its upper position with key 86 bottomed on collar 92 as shown in FIG. 9. Adhesive is applied to the faces 30 on the six ceramic magnets 18, and they are then positioned roughly in pin assemblies 114 with the radial position of magnets 18 set by pin 118, 119 and the circumferential or angular position set by faces 130, 132 on the main locater pins 116. With a horizontally disposed plate 54 on a vertical arbor, the pin assemblies 114 provide a very simple locating arrangement. The operator then places flywheel housing 14 on the tapered pin portion 82 with key 86 engaged in keyway 26 to accurately position the flywheel angularly of the fixture. The correct circumferential positioning of the magnets 18 on the finished flywheel 12 will be of more or less criticality depending on the specific application. For the specific six-magnet alternator flywheel being described, it is preferred that the magnet location be set relative to the keyway so that the magnet position is predetermined relative to core legs on the stator and the ignition used. For example, at least one magnet will have to be located circumferentially of the flywheel for a breaker-point ignition so that the one magnet is properly positioned on the magneto E core at a predetermined angular position of the crankshaft. The positioning may similarly be critical with other types of ignitions such as a solid-state, capacitor-discharge ignition where part of the triggering arrangement is carried on flywheel 12 and indeed could possibly be actuated by one of the magnets 18. Precise angular location may not be important for other dynamoelectric applications. In any event, assuming some criticality with respect to the positioning of the magnets circumferentially of the flywheel, accurate circumferential positioning is assured by means of key 86.

Figures 4, 5, 6:
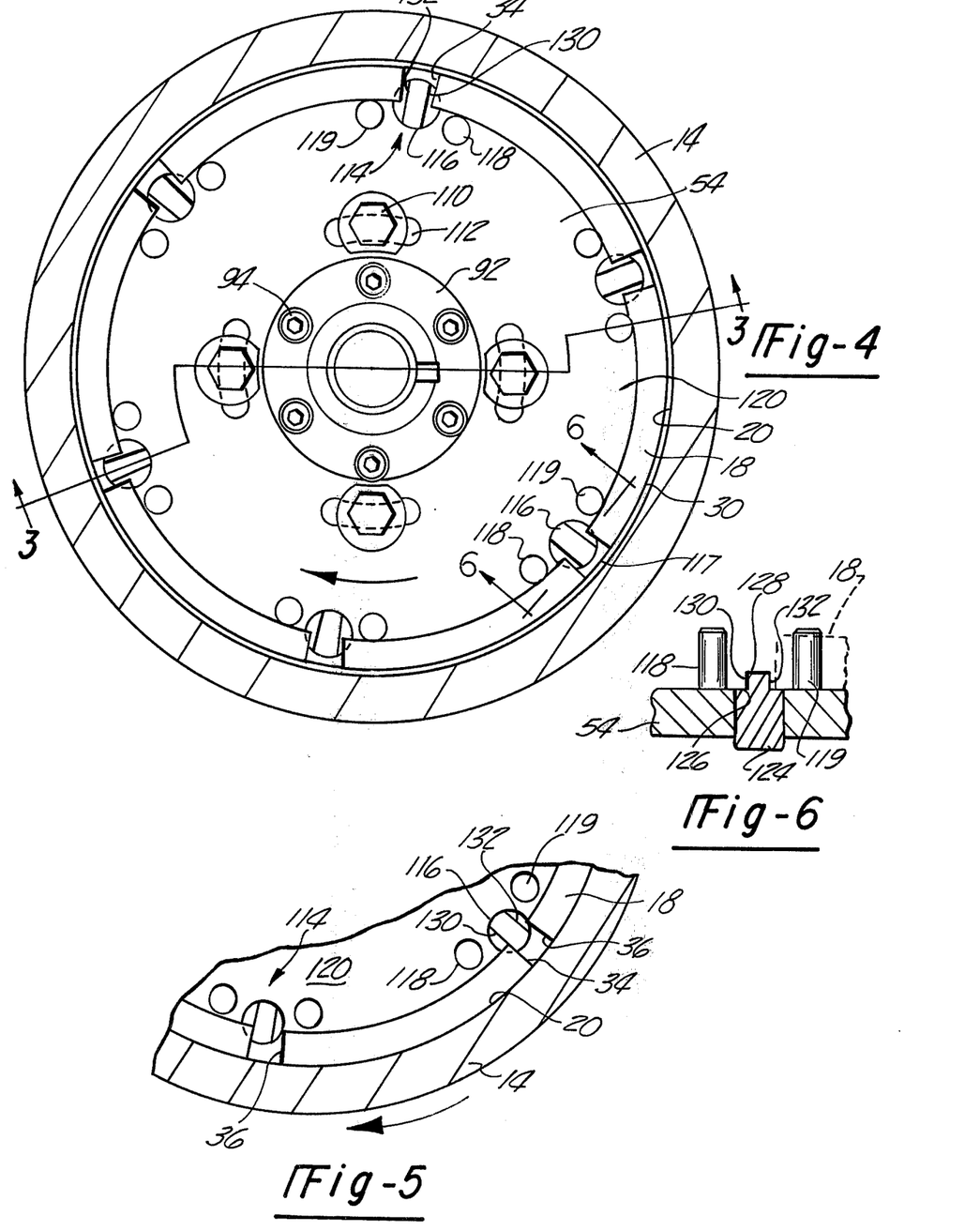
FIG. 4 is a horizontal section taken on line 4—4 of FIG. 3 with the hub of the flywheel omitted.
FIG. 5 is an enlarged fragmentary vertical section showing the position of the magnets on guide pins as the magnets move outwardly due to centrifugal force.
FIG. 6 is a fragmentary vertical section taken on line 6—6 of FIG. 4 with the magnets removed.
Figure 7:
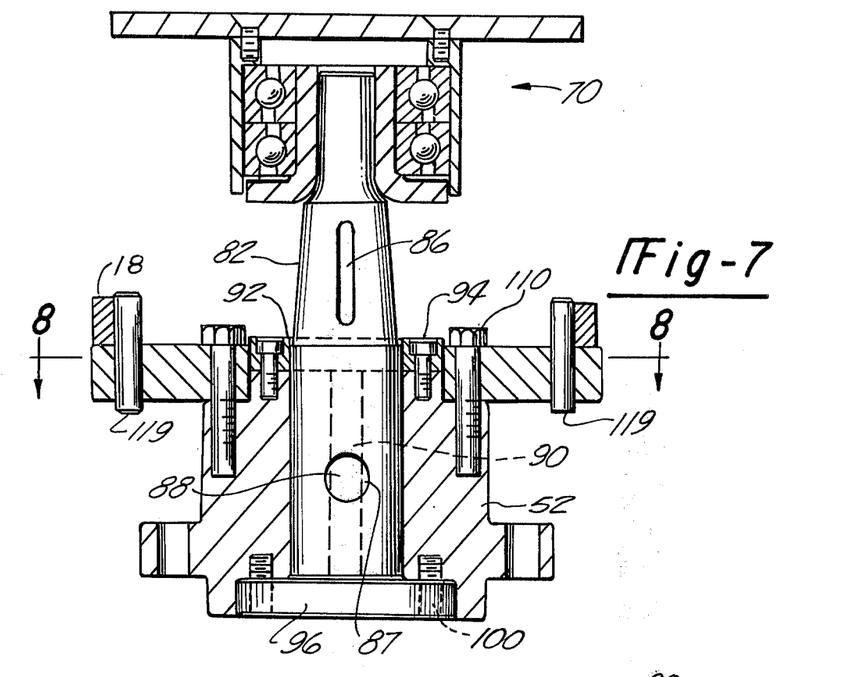
FIG. 7 is a view partly in cross section of the apparatus of FIG. 3 taken generally from the right of FIG. 3 and with the flywheel and a lower sleeve omitted.
Figure 8:
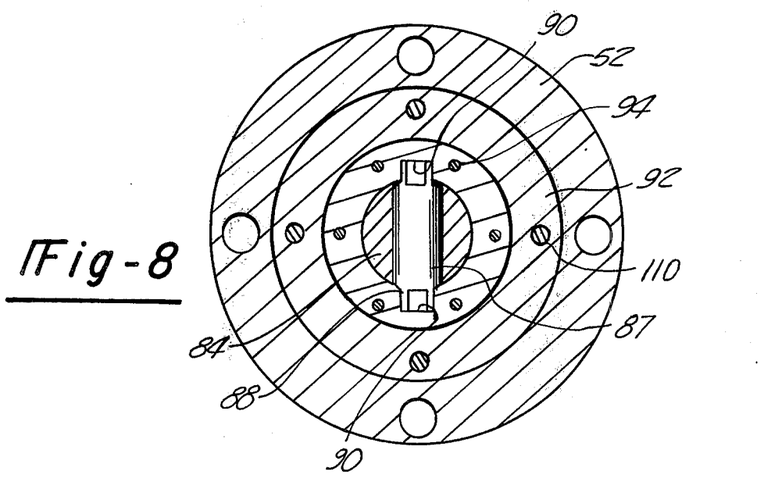
FIG. 8 is a horizontal section taken on line 8—8 of FIG. 7 with the main top plate removed.
Figure 10:
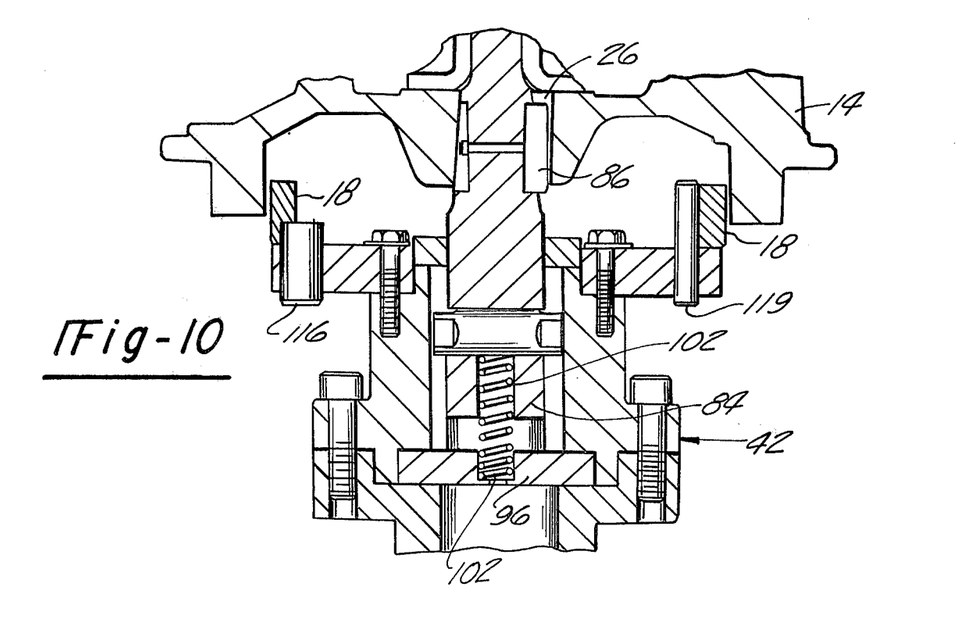
FIG. 10 is a further vertical section through the fixture showing the flywheel and magnets in place with the arbor partially depressed as it appears just prior to completing the setup of the fixture.

When the operator places the flywheel housing 14 in place, the weight of the housing causes the pin 50 to move partially downward, further compressing spring 102 to an intermediate position shown in FIG. 10. The operator then slips the hold-down assembly onto the pilot 80 and closes cover 72 to position the parts as shown in FIGS. 3 and 7. The cover is held closed and motor 62 is energized to rotate magnets 18 and housing 14 in unison with centrifugal force causing the magnets to move radially outwardly against the inner peripheral surface 20 of the housing 14 as shown in FIG. 5. For an assumed clockwise rotation of plate 54 in FIG. 5, as the magnets 18 move radially outwardly under centrifugal force and circumferentially due to rotational forces, the trailing end face 34 of each magnet 18 engages the leading radial face 130 on the trailing one of the pins 116 (the pin 116 adjacent the trailing face 34 of each magnet) to guide the magnet against the housing 14 and maintain it properly positioned while the adhesive sets.

As shown in FIG. 5, the leading faces 36 on magnets 18 and the trailing faces 132 on the pins 116 play no part in the final positioning of the magnet. The use of the single radial face 130 on pins 116 as the main locating means with the magnet engaging the pin due to rotational forces is of particular advantage in locating ceramic magnets. In commercially available ceramic magnets, the grinding process may produce a skewed configuration even though the curvature and concentricity of the faces 30, 32 are otherwise within acceptable tolerances. Stated differently, the end faces 34, 36 and the top and bottom faces 38, 40 may not be true to the curved surfaces. However, since only the trailing face 34 of the magnet 18 is engaged by face 130 and the magnet is not pressed against plate 54, the magnet can cant or skew slightly axially of the housing (i.e., rotate slightly about a radial axis) to seek the best fit with the flywheel housing. Hence it is even possible and indeed not unlikely that the magnet will skew slightly to find this optimum fit. This is a substantial improvement over the rigid pressure fixture that is not self-adjusting to the magnet and the contour of the flywheel as in the case of the previously identified Harkness et al U.S. Pat. No. 3,818,586.

Returning to the assembly operation, after the fixture has been spinning for sufficient time for the adhesive to set up, motor 62 is shut off, the arbor stops rotating, the cover is removed and the flywheel 12 with magnets 18 bonded thereto is removed from the fixture. As compared to prior assembly techniques, the centrifugal force bonding process results in better tolerances on the inner periphery defined by the inner magnet surfaces 32. This means that the inside diameter of the finished flywheel 12 provides a uniform air gap by comparison to prior art techniques with no further machining of the magnets. After the flywheel 12 is removed from the fixture 41, the adhesive is allowed to cure and at some later time the magnets 18 are zone charged by conventional techniques to provide the desired magnetic pole configuration.

Although various adhesives and bonding procedures are contemplated by the present invention, in one embodiment the adhesive used was an anaerobic adhesive identified as Loctite 317 adhesive sold commercially by Loctite Corporation, North Mountain Road, Newington, Conn. 06111. Although anaerobic adhesives must be used with caution, the procedures for using anaerobic adhesives in industrial applications is known. In general, the flywheel is cleaned, phosphatized and heated to 120° F just before the bonding operation. A primer such as Loctite LO244 is painted on the flywheel in the magnet bonding area. The magnets should be free of all foreign material, and they are wiped clean with a chlorinated solvent. With the magnets at an ambient room temperature of about 70° F, they do not have to be heated. For flywheels having an inside diameter in the range of say 5.5 to 6.5 inches, pins 118, 119 were located to provide a radial clearance of 0.062 of an inch between the outer surface 30 of the magnets 18 and the inner peripheral diameter 20 of the flywheel prior to spin-up with the parts positioned as shown in FIGS. 3 and 4. Hence the magnets 18 move radially a distance equally to this clearance under centrifugal force. For this particular range of flywheel diameters, the fixture was rotated at 1800 rpm by a direct-drive, three-horsepower motor to provide a minimum radially outward pressure on the magnets of approximately 5 psi. The motor has rapid acceleration to get the magnets in position before the adhesive starts to set. For the embodiment being described, the fixture was spun for 30 seconds with an additional 4–5 seconds allowed for the parts to stop rotating. This allows the adhesive to set so that the magnets will not move, and final curing may take up to several days. As is well known with anaerobic adhesives, the adhesive cures without air and hence it is important that the magnet seek the best overall fit with the flywheel over a major portion of the interface area. With the present invention, the maximum clearance between the magnet and the flywheel over about 85 percent of the interface is less than 0.006 of an inch. This is well below that required by the adhesive manufacturers' specifications.

Figure 11:
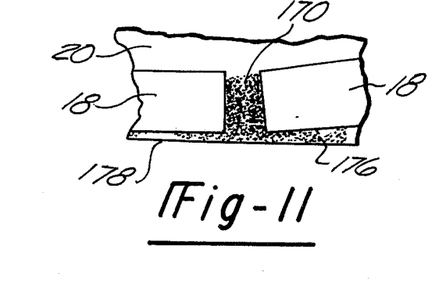
FIG. 11 is a fragmentary view of two magnets on the flywheel taken in a radial direction on lines 11—11 of FIG. 1.
Figure 12:
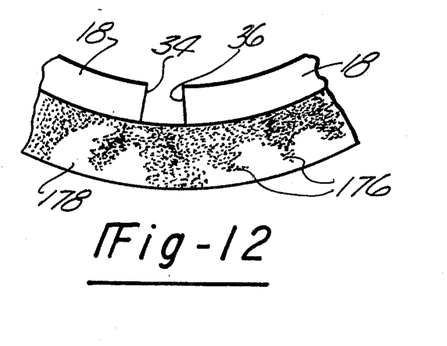
FIG. 12 is a fragmentary end view taken from the bottom of FIG. 11.

Although excessive applications of adhesives should be avoided, sufficient adhesive should be applied to the magnets so that a slight trace of adhesive squeezes out at the interface between the magnet and the flywheel. It has been noticed that this slight excess of adhesive forms a distinctive pattern on the flywheel made by the present invention as compared to flywheels made by prior art techniques. Referring to FIGS. 11 and 12, excess adhesive will be smeared at 170 over the inner surface 20 of the flywheel between face 36 of the right-hand magnet 18 and face 34 of the left-hand magnet even though adhesive was not applied in this area. However, even more distinctive are plume-like smears or tracings 176 formed by excess adhesive with the plumes extending axially downwardly on surface 20 and then radially outwardly on the bottom edge 178 of the housing 14. FIG. 11 also shows the right-hand magnet 18 is a skewed orientation, slightly exaggerated, for purposes of illustrating the manner in which the magnet can seek the fit with the flywheel.

Although a specific embodiment of fixture 41 has been described hereinabove, it will be immediately apparent that the fixture can be used for various applications. For a flywheel having a different crankshaft taper, it is only necessary to remove collar 92 and replace the pin 50 with a pin having the appropriate taper in section 82. The main plate 54 can similarly be easily replaced for different magnet configurations and different diameter flywheels. The invention is also useful with arrangement having any number of magnets, and it is not necessary that the magnets be equally spaced circumferentially around the entire inner periphery of the flywheel. For example, the centrifugal bonding process described hereinabove can be used to install a single magnet at a specified angular position on the flywheel and simultaneously bond an appropriate counterweight to the flywheel diametrically opposite the single magnet. Other combinations of magnets and/or counterweights can also be secured to the flywheel depending upon the type of ignition and/or alternator to be powered. Hence various magnet sizes, counterweights and inner-diameter flywheel combinations can be built up with the same basic fixture by merely changing plate 54. Of course, the present invention would also be useful in securing magnets to dynamoelectric rotors other than for internal combustion engines.

It will be understood that the method and apparatus for bonding ceramic magnets to a flywheel have been described hereinabove for purposes of illustration and are not intended to indicate limits of the present invention, the scope of which is defined by the following claims.

I claim:

1. The method of attaching a magnet on a radially inner surface of a rotor for use in a dynamoelectric system and the like wherein magnet is to be located at a predetermined angular position on said rotor, the steps of applying an adhesive to either said magnet or said rotor at a proposed interface therebetween, positioning said magnet within said rotor, spinning said rotor and said magnet about a rotational axis of said rotor while aligning said magnet at said predetermined angular position on said rotor as said magnet is pressed against said rotor by centrifugal force and continuing to spin said rotor and said magnet to maintain said magnet pressed against said rotor while said adhesive sets.

2. The method set forth in claim 1 wherein said magnet has radially inner and radially outer faces and a pair of end faces spaced circumferentially of said rotor and wherein said magnet is aligned by guiding one of said end faces of said magnet.

3. The method set forth in claim 2 wherein said magnet rotates in a predetermined rotational direction so that a first of said end faces leads the other trailing end face as said magnet moves in the direction of rotation, and wherein said magnet is aligned by guiding said other trailing end face.

4. The method set forth in claim 1 wherein said magnet is also to be located at a predetermined position axially of said rotor and wherein said magnet is also guided axially toward said axial position.

5. The method set forth in claim 4 wherein said magnet has generally top and bottom faces spaced axially of said rotor and wherein said magnet is guided axially by engaging said bottom face.

6. The method set forth in claim 5 wherein said magnet is guided axially in a manner permitting said magnet to rotate slightly about a generally radial axis as said magnet is pressed against said rotor so that said magnet can seek a close fit with the inner rotor surface.

7. The method set forth in claim 4 wherein said magnet is initially positioned within said rotor, prior to spinning, closely adjacent to said rotor and generally aligned axially of said rotor at said predetermined axial position.

8. The method set forth in claim 1 wherein said magnet is aligned in a manner fixing the position of said magnet circumferentially of said inner rotor surface but permitting said magnet to rotate slightly about a generally radial axis as said magnet is pressed against said rotor so that said magnet can seek a close fit with the inner rotor surface.

9. The method set forth in claim 1 wherein said magnet is located within said rotor, prior to spinning, closely adjacent said inner surface thereof and at an angular position generally aligned with said predetermined angular position on said rotor.

10. The method set forth in claim 1 wherein said magnet and said rotor are spun in unison.

11. The method set forth in claim 1 wherein centrifugal force is the sole force passing said magnet against said rotor while said adhesive sets.

12. The method set forth in claim 1 wherein, prior to spinning, the magnet is located radially inwardly of and closely adjacent said inner peripheral surface of said rotor and said magnet is moved outwardly due to centrifugal force when said magnet and said rotor are spun.

13. The method set forth in claim 12 wherein said centrifugal force is a sole force causing said magnet to move radially outwardly into engagement with said rotor.

14. The method set forth in claim 1 wherein a plurality of magnets are simultaneously attached to said rotor by applying adhesive to said rotor or to all of said magnets at the proposed interfaces therebetween, positioning all of said magnets within said rotor, spinning said rotor and said magnets while aligning said magnets at predetermined angular positions on said rotor as said magnets are pressed against said rotor by centrifugal force and continuing to spin said rotor and said magnets to maintain said magnets pressed against said rotor while said adhesive sets.

15. The method set forth in claim 14 wherein, prior to spinning, all of said magnets are initially positioned within said rotor in general axial and radial alignment with said predetermined positions and said magnets are guided into precise predetermined positions on said rotor as said magnets move radially outwardly due to centrifugal force when said magnets are spun.

16. The method set forth in claim 1 wherein said rotor is positioned with its rotational axis vertically disposed during spinning and said centrifugal force is applied to said magnet in a horizontal direction.

17. The method of attaching a plurality of magnets on a radially inner surface of a rotor for use in a dynamoelectric system and the like wherein said magnets are to be located at predetermined positions angularly and axially of said rotor, the steps of applying adhesive to either said rotor or to all of said magnets at proposed interfaces between said magnets and said rotor, positioning said magnets within said rotor radially inwardly of and adjacent to said inner peripheral surface of said rotor and at angular and axial positions generally aligned with said predetermined axial and angular positions, spinning said rotor and said magnets in unison about a rotational axis of said rotor while guiding said magnets to said predetermined axial and angular positions on said rotor as said magnets move radially outwardly and are pressed against said rotor by centrifugal force, and continuing to spin said rotor and said magnets to maintain said magnets pressed against said rotor while said adhesive sets.

18. The method set forth in claim 17 wherein said rotor has a hub configured to mate with a crankshaft or the like in a predetermined angular relationship to said crankshaft, said predetermined angular positions on said rotor being precisely located relative to said hub configuration, said magnets are positioned prior to spinning in a generally circular array with substantially equal circumferential spacing therebetween and wherein said rotor is positioned over said magnet array with said hub having a predetermined angular orientation relative to said array.

19. The method set forth in claim 18 wherein said array is disposed in a generally horizontal plane, said rotor and said magnets are spun on a generally vertical axis so that centrifugal force moves said magnets horizontally into engagement with said rotor.

20. The assembly method of permanently attaching a magnet on a radially inner surface of a rotor for use in a dynamoelectric system and the like wherein said magnet is to be located at a predetermined angular position on said rotor, the steps of positioning said magnet within said rotor, spinning said rotor and said magnet about a rotational axis of said rotor while aligning said magnet at said predetermined angular position on said rotor as said magnet is clamped against said rotor by centrifugal force, and permanently attaching said magnet to said rotor while said rotor and said magnet are spinning to maintain said magnet clamped against said rotor by centrifugal force during the attaching operation.

21. The method set forth in claim 20 wherein said magnet is permanently attached to said rotor by bonding said magnet to said inner surface of said rotor while the rotor and magnet are spinning.

22. The method set forth in claim 20 wherein said centrifugal clamping forces are th sole clamping forces applied to said magnet.

23. The method set forth in claim 20 wherein a plurality of magnets are simultaneously attached to said rotor at predetermined positions thereon and said magnets are simultaneously clamped against said rotor by centrifugal force while being attached thereto.

24. The method of attaching a plurality of individual discrete parts at predetermined circumferentially spaced positions on an interior surface of a member comprising the steps of arranging said discrete parts in a circumferential array such that when said member is placed over said array in a predetermined orientation said parts are located radially inwardly of said member and at circumferential positions generally aligned with said predetermined positions on said member, applying adhesive to either said parts or said member at proposed interfaces therebetween, positioning said member over said array in said predetermined orientation, spinning said member and said array in unison while guiding said parts into engagement with said member at said predetermined locations while said parts move radially outwardly and are pressed against said member by centrifugal force and continuing to spin said member and said parts to maintain said parts pressed against said rotor while said adhesive sets.

* * * * *